United States Patent
Yang et al.

(10) Patent No.: US 8,315,183 B2
(45) Date of Patent: Nov. 20, 2012

(54) CHANNEL QUALITY INDEXING AND REVERSE INDEXING

(75) Inventors: Rongzhen Yang, Shanghai (CN); Huaning Niu, Milpitas, CA (US); Shi Liu, Shanghai (CN); Yang-Seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 12/646,745

(22) Filed: Dec. 23, 2009

(65) Prior Publication Data

US 2011/0149758 A1 Jun. 23, 2011

(51) Int. Cl.
*H04J 3/14* (2006.01)
(52) U.S. Cl. .......................... 370/252; 370/329
(58) Field of Classification Search .................. 370/252, 370/229, 235, 332, 333, 328, 329, 344, 310, 370/343, 430; 455/69, 62, 450, 452.2, 67.13, 455/135, 277.2; 375/260, 259; 714/776
See application file for complete search history.

(56) References Cited

U.S. PATENT DOCUMENTS

| | | | |
|---|---|---|---|
| 5,828,590 A | 10/1998 | Chen | |
| 6,725,246 B2 | 4/2004 | Yang | |
| 7,636,550 B2 * | 12/2009 | Yuen et al. | 455/62 |
| 7,933,238 B2 * | 4/2011 | Sartori et al. | 370/328 |
| 7,970,001 B2 * | 6/2011 | Hoshino et al. | 370/430 |
| 7,974,242 B2 * | 7/2011 | Yang et al. | 370/332 |
| 8,009,656 B2 * | 8/2011 | Kishigami et al. | 370/344 |
| 8,014,455 B2 * | 9/2011 | Kim et al. | 375/260 |
| 8,020,075 B2 * | 9/2011 | Kotecha | 714/776 |
| 8,064,406 B2 * | 11/2011 | Chun et al. | 370/332 |
| 8,094,733 B2 * | 1/2012 | Kwon et al. | 375/260 |

OTHER PUBLICATIONS

Rongzhen Yang, et al., "Varying-Radix Numberation System and Its Applications", Intel China Software Lab, 4th Floor, Building 18, Gui Ping Road, Caohejing, Shanghai 200233, PRC. 4231 8th Ave NE, Apt. C, Seattle, WA 98105, USA. CIM Institute, 12th Floor, HaoLang Building, JiaoTong University, Shanghai 200030, PRC 3 pages.

* cited by examiner

*Primary Examiner* — Michael Thier
*Assistant Examiner* — Abdullah Riyami
(74) *Attorney, Agent, or Firm* — Blakely, Sokoloff, Taylor & Zafman LLP (57) ABSTRACT

Channel quality indexing and reverse indexing is described. In one example, a quality value for subbands of a radio communications system are measured. An index for each quality measurement is then determined and a combinatorial index is generated to reflect the indices and the selected subbands. The combinatorial index is then sent to a radio station using a radio communications channel.

13 Claims, 4 Drawing Sheets

| Table Index | VR number v(4) v(3) v(2) v(1) | Calculated Decimal Number | Bit Sequence |
|---|---|---|---|
| 1 | 0 \| 0 \| 0 \| 0 | 0 | 000000001111 |
| 2 | 0 \| 0 \| 0 \| 1 | 1 | 000000010111 |
| 3 | 0 \| 0 \| 0 \| 2 | 2 | 000000100111 |
| 4 | 0 \| 0 \| 0 \| 3 | 3 | 000001000111 |
| . | | | |
| . | | | |
| 248 | 1 \| 2 \| 4 \| 0 | 247 | 011000010010 |
| 249 | 1 \| 2 \| 4 \| 1 | 248 | 101000010010 |
| 250 | 1 \| 2 \| 5 \| 0 | 249 | 110000010010 |
| . | | | |
| . | | | |
| 492 | 7 \| 0 \| 0 \| 1 | 491 | 101110000000 |
| 493 | 7 \| 0 \| 1 \| 0 | 492 | 110110000000 |
| 494 | 7 \| 1 \| 0 \| 0 | 493 | 111010000000 |
| 495 | 8 \| 0 \| 0 \| 0 | 494 | 111100000000 |

| Table Index | VR number v(4) v(3) v(2) v(1) | Calculated Decimal Number | Bit Sequence |
|---|---|---|---|
| 1 | 0 \| 0 \| 0 \| 0 | 0 | 000000001111 |
| 2 | 0 \| 0 \| 0 \| 1 | 1 | 000000010111 |
| 3 | 0 \| 0 \| 0 \| 2 | 2 | 000000100111 |
| 4 | 0 \| 0 \| 0 \| 3 | 3 | 000001000111 |
| . | | | |
| 248 | 1 \| 2 \| 4 \| 0 | 247 | 011000010010 |
| 249 | 1 \| 2 \| 4 \| 1 | 248 | 101000010010 |
| 250 | 1 \| 2 \| 5 \| 0 | 249 | 110000010010 |
| . | | | |
| 492 | 7 \| 0 \| 0 \| 1 | 491 | 101110000000 |
| 493 | 7 \| 0 \| 1 \| 0 | 492 | 110110000000 |
| 494 | 7 \| 1 \| 0 \| 0 | 493 | 111010000000 |
| 495 | 8 \| 0 \| 0 \| 0 | 494 | 111100000000 |

CHANNEL QUALITY INDEXING AND REVERSE INDEXING

FIELD

The present description relates to the field of control channel signaling in a radio data communications system and, in particular, to determining indexes for system parameters.

BACKGROUND

Wireless networking systems have developed techniques to enhance service using feedback from subscribers. In some cellular telephone systems, for example, the mobile cellular telephone measures the quality of their reception and report results back to the base station. The base station uses this information to assign channels. Ideally, each cellular telephone is assigned to a channel that works well for that telephone.

Similarly, for radio data communication networks, the networked terminals can send information to peer, access point, and base station terminals about the quality of the channels that they are using and the quality of other channels that they can receive. This allows the system to allocate channels for more efficient use of the spectrum and to improve the quality of reception for many of the terminals.

In IEEE 802.16m, CQI (Channel Quality Indicator) feedback is sent on a CQICH (CQI Channel). The feedback is sent on an overhead channel and can be sent whether the MS (Mobile Station) is awake or asleep.

BRIEF DESCRIPTION OF THE DRAWINGS

Embodiments of the present invention are illustrated by way of example, and not limitation, in the figures of the accompanying drawings in which like reference numbers are used to refer to like features, and in which.

DETAILED DESCRIPTION

CQI feedback is sent in a SFBCH (Secondary Feedback Channel) which is a PHY (Physical Layer Channel) in 802.16m. CQI feedback is sent with a header to identify the message as CQI. 802.16m provides for two different types of CQI feedback, average CQI feedback, and CQI feedback for the preferred bandwidth indicated in the header of the message. This typically is the bandwidth being used by the MS.

In one use of the CQI channel, after an MS turns on its power, it receives the broadcast channel data and sends capabilities to a BS. As soon as the BS and the MS know the capabilities of both entities modulation and coding, the BS may allocate a CQICH subchannel using a CQICH IE. The MS then uses the allocated subchannel to send periodic CINR (Carrier to Interference and Noise Ratio) reports. For the report on a preamble, the BS can request the MS to report the CINR based on the measurement from received preambles for the different frequency reuse factors. For a report on specific permutation zones, the CQICH Allocation IE indicates a report type configuration, which includes a zone for which the CINR is to be estimated.

The MS measures the CINR in the frames in which the specified zone is allocated. Depending on the report type configuration, the MS may report only for a subset of the major groups or for all of the major groups. In the reports, the measurements are quantized and encoded. They are then sent to the BS on the fast-feedback channel or another allocated channel.

An effective CINR reported on the CQI can be used as a recommended channel allocation. The report identifies a channel that best meets a specified target error rate. The MS may send an unsolicited report if the last effective CINR report is no longer accurate, due to changing channel conditions.

The BS, upon request, allocates band AMC (Adaptive Modulation and Coding) subchannels to the MS using the CQI report. One type of exchange in 802.16m has the MS sending a REP-RSP (Channel Measurement Report Response) and then the MS starts reporting the differential of the CINR for four selected bands. The MS reports the differential of the CINR for four or five selected bands (increment: 1 and decrement: 0 with a step of 1 dB) on its allocated fast-feedback channel (CQICH). The band indexes are mapped from LSB (Least Significant Bit) to MSB (Most Significant Bit) of the CQICH codeword in increasing order. The BS then allocates subchannels to the MS using the reports.

The standard uses two different types of CQI reports, wideband and subband. The Wideband CQI is an average CQI over the whole band corresponding to the MIMO (Multiple In Multiple Out) antenna mode. If there are multiple DL (downlink) frequency partitions, then the wideband CQI is an average CQI over the corresponding frequency partitions.

The Subband CQI is represented by one base CQI (ave_CQI) divided by the selected M subbands plus a differential CQI, which is used for a designation of the best-M feedback.

For best-M feedback, the subband selection and Ave_CQI and Diff_CQI may be reported at different intervals, and share the same FBCH (Feedback Channel). Subband selection and Ave_CQI will puncture the Diff_CQI at every long term feedback report period if TDM (Time Division Multiplexing) is enabled. For the best-M feedback which is used in Subband CQI, the locations of the best-M subbands need to be indexed by the MS side and reverse indexed by the BS.

The indexing reduces the amount of data to be transmitted. Since the CQICH is used frequently, keeping the messages small improves the spectral efficiency of the system. While the number of bits to signal the best-M sub-band position is defined in the feedback format. The indexing can be determined in different ways. An approach to sub-band indexing for best-M feedback in is described below.

The MS reports the M selected subbands using an index r defined as $$r = \sum_{i}^{M} \binom{S_i}{i},$$

Where $S_i$ is the i'th subband index and the set $\{s_i\}_{i=1}^{M}$, ($0 \leq s_i \leq N-1$, $s_i < s_{i+1}$) contains the M sorted subband indices, $$\begin{pmatrix} x \\ y \end{pmatrix} = \begin{cases} \begin{pmatrix} x \\ y \end{pmatrix} & x \geq y \\ 0 & x < y \end{cases}$$

is the extended binomial coefficient, resulting in the unique index $$r \in \left\{ 0, \ldots, \begin{pmatrix} N \\ M \end{pmatrix} - 1 \right\}.$$

As an alternative, the index r can be defined as follows:

$$r = \begin{pmatrix} N \\ M \end{pmatrix} - \sum_{i=0}^{M-1} \begin{pmatrix} S_i - 1 \\ i+1 \end{pmatrix} - 1,$$

Where

The set $\{s_i\}_{i=0}^{M-1}$, ($1 \leq s_i \leq N$, $s_i < s_{i+1}$) contains the M sorted subband indices, $$\begin{pmatrix} x \\ y \end{pmatrix} = \begin{cases} \begin{pmatrix} x \\ y \end{pmatrix} & x \geq y \\ 0 & x < y \end{cases}$$

is the extended binomial coefficient

Resulting in the unique label $$r \in \left\{ 0, \ldots, \begin{pmatrix} N \\ M \end{pmatrix} - 1 \right\}.$$

Figure 1:
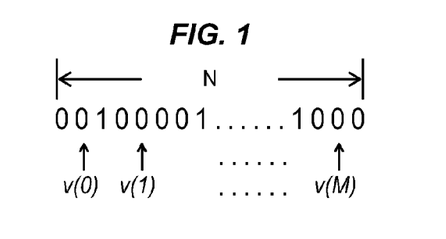
FIG. 1 is a diagram of subband indices to which embodiments of the invention may be applied.

A varying radix approach to indexing allows the best M value to be easily represented. This can be seen in part in FIG. 1. The diagram of FIG. 1 shows that there are N subbands. Each v represents the CQI value for each subband. These correspond to the numerical values of 0 or 1 for each v from v(0) to v(M).

Figure 2:
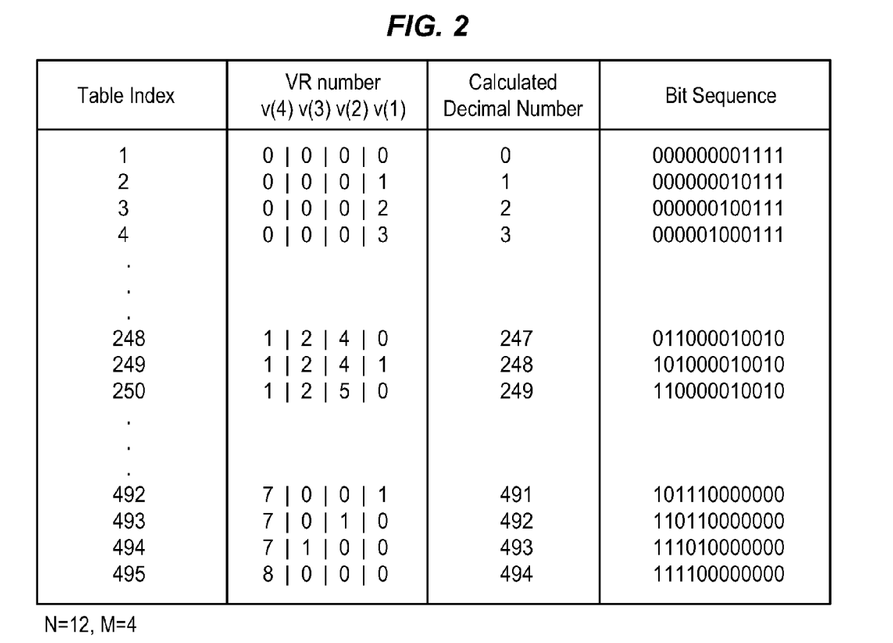
FIG. 2 is a diagram of subband indices in a table form to embodiments of the invention may be applied.

FIG. 2 shows how a set of index values might be expressed in for various index values. In this example, there are twelve total subbands (N) and four subbands (M) for the CQI report. The table index provides a reference for a possible lookup table. The VR (varying radix) number provides the CQI value for each subband. These numbers are converted into a decimal number that corresponds to the indicted bit sequence. The bit sequence is transmitted between the MS and the BS.

When the BS receives the report through the SFBCH (secondary feedback channel), the BS may calculate the subband location information $\{s_i\}_{i=1}^{M}$ by a varying radix reverse indexing algorithm. The algorithm performs a function of generating a decimal number of the varying-radix number with radix 0:

Algorithm Initialization:
1) Input Parameters: N, M, r;

2) $r = \begin{pmatrix} N \\ M \end{pmatrix} - 1 - r;$ i=M; v(1~M)=0; BaseValue=0;
Algorithm Body:
Repeat the following steps 1, 2, 3, if (i>0) and (r>0):
   1. calculate IncreaseValue:

$$IncreaseValue = \begin{pmatrix} N - M + 1 - \left( \sum_{j=i+1}^{M} v(j) \right) - v(i) + i - 2 \\ i - 1 \end{pmatrix}$$

2. ThresholdValue=BaseValue+IncreaseValue;
   3. If r>=ThresholdValue then
      v(i)=v(i)+1;
      BaseValue=Threshold Value;
   else
      r=r−BaseValue;
      i=i−1;
      BaseValue=0;
   end
Algorithm Output:
After the algorithm body, the following vector is obtained:
   v(M) v(M−1) v(M−2) . . . v(1)
This leads to:

$$v(0) = N - M - \sum_{i=1}^{M} v(i)$$

$$s_i = i - 1 + \sum_{j=0}^{i} v(j); i = 1 \sim M;$$

The set $\{s_i\}_{i=1}^{M}$, ($0 \leq s_i \leq N-1$, $s_i < s_{i+1}$) contains the M sorted subband indices Alternatively, the BS can determine the indices using a table. The table is large, however. If N=24, M=4, then the table will have a length of 10626 and will consume a little less than 64 kbytes of memory. Solving the varying-radix problem above, however, can be done very quickly.

The approach described above can be used for a best M position indexing and reverse indexing method for CQI feedback in IEEE 802.16m based systems. It can also be applied to next generation OFDMA (Orthogonal Frequency Division Multiple Access)-based wireless broadband technologies and related products, such as 802.16e, 802.16m (WiMax II air interface), 3GPP LTE (Third Generation Partnership Project Long Term Evolution), 3GPP UMB (Ultra Mobile Broadband) etc, to increase the diversity gain of distributed sub-channels.

Figure 3:
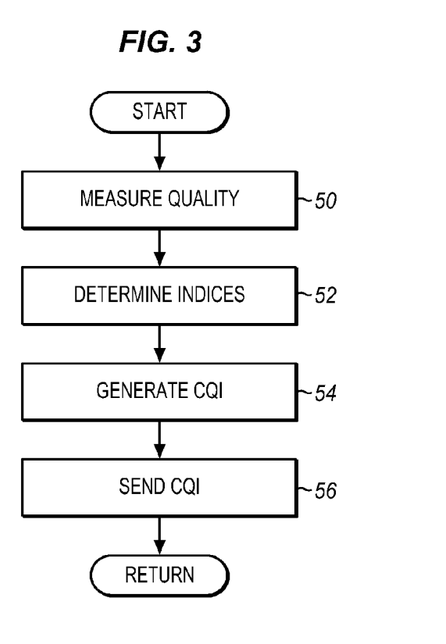
FIG. 3 is a process flow diagram of subband indexing according to an embodiment of the invention.

FIG. 3 is a process flow diagram of indexing the quality measurements for CQI or a similar type of transmission. At block 50, one or more quality values, for example CINR are measured for each of the subbands. In 802.16m, typically 4 subbands are measured and these are assigned by the base station. However any number of subbands may be measured and these can be determined in any of a variety of different ways.

At block 52, an index, such as 0 or 1, is determined for each quality measurement. At block 54, an index is generated that combines the results for each of the subbands. In the examples above the index is a combinatorial that will be used as the CQI, however, other approaches can also be used depending on the particular application. The combinatorial index reflects the indices and the selected subbands.

At block 56, the combinatorial index is sent to a radio station using a radio communications channel. This can be from the MS to the BS or vice versa. As mentioned above, the indices can also be sent to peer terminal, depending on the particular use to be made of the indices. The operations of FIG. 3 can be repeated at regular intervals to ensure that the information remains accurate.

Figure 4:
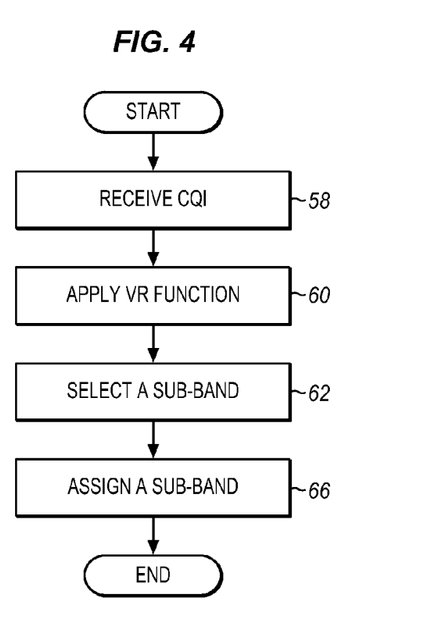
FIG. 4 is a process flow diagram of reverse subband indexing according to an embodiment of the invention.

FIG. 4 is a process flow diagram of reverse indexing a received index. At block 58, a combinatorial index of channel quality is received from a radio station over a radio communications channel. This can be from a MS, or from a BS, or from another type of station. In 802.16m, the index can be a CQI, but other indices can also be selected.

At block 60, a varying radix function is applied to the combinatorial index to determine the indices for each subband. In one example, the function is used to derive varying radix values for quality measurement indices that were determined by the sending station. In the examples above, these measure are of a known number of subbands of the BS's radio communications channel.

At block 62 a subband is selected based on the derived quality measurement indices, and at block 64, the selected subband is assigned. In the case of a BS, the MS that sent the CQI will be assigned to the selected subband. The subband is then used for communications between the MS and the BS.

Figure 5:
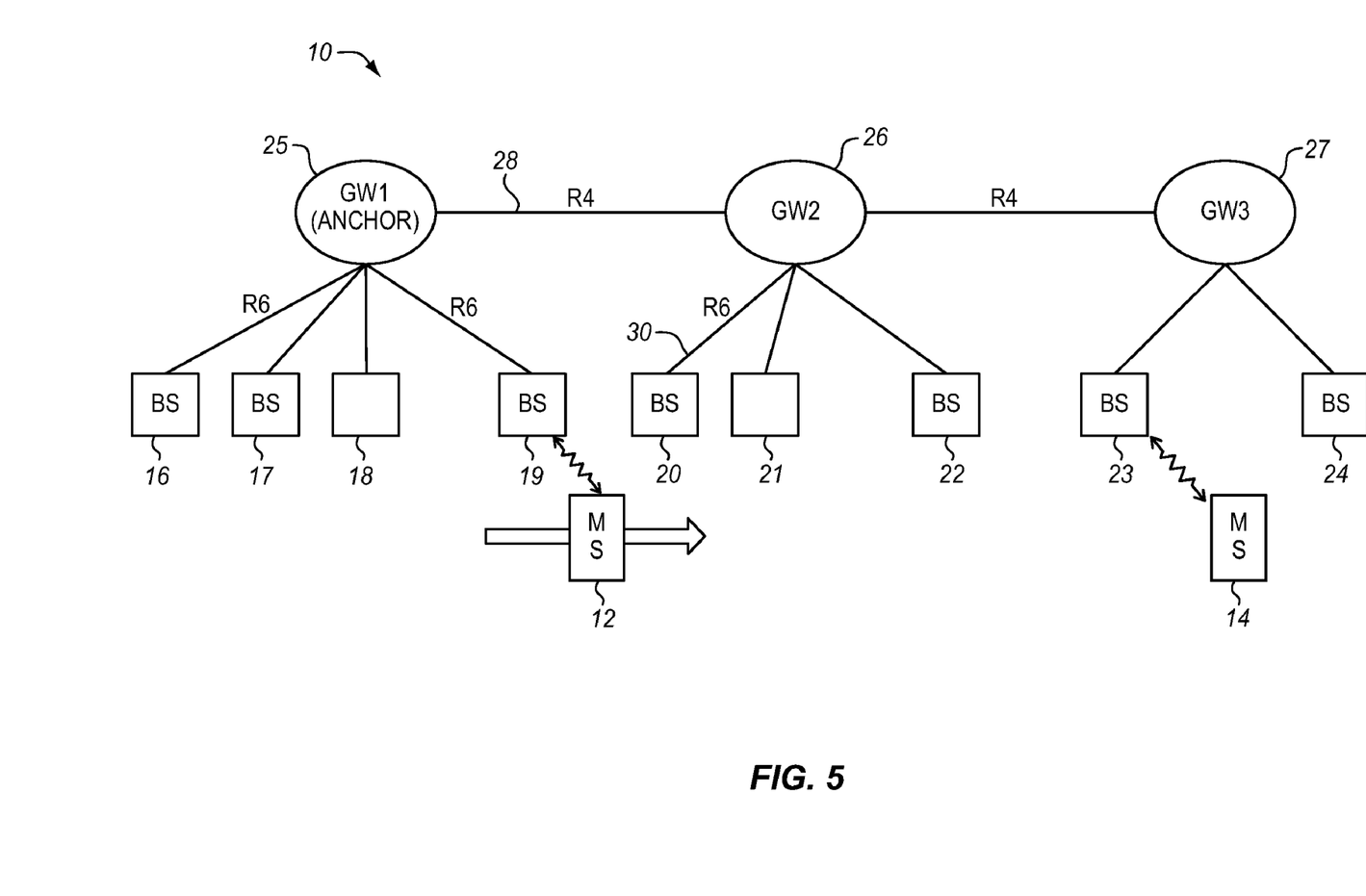
FIG. 5 is a diagram of a wireless radio system suitable for implementation of an embodiment of the present invention.

FIG. 5 shows an example of a cellular radio system 10. MSs (mobile station) 12, 14 can be mobile or fixed and can take the form of cellular telephones, netbooks, personal computers, media players, appliances, or any of a variety of other wireless connected devices. The MS can also be referred to as a subscriber station, remote station, terminal, or by other terms.

A number of base stations (BS) 16-24 are provided in the system to provide connections for the MS. The BS can take a variety of different forms and may cover large or small areas and transmit powers, depending on the application. While the BSs are shown as being similar in FIG. 5, they may be connected and configured differently from each other as well. In some applications, a network access point or an MS peer may act or function as a BS. In the illustrated example, the first MS is registered with a BS 19 and the second MS is registered with another BS 23. This registration allows each MS to communicate with the BS to support all of the services that the MS and the system support.

Each BS 16-24 is connected via an R6 interface 30 to a gateway (GW) or base station controller. In the case of WiMAX, the base station controllers are referred to as ASN-GW (Access Service Network-Gateway). There are three gateways 25, 26, 27. Each gateway supports several BSs. The gateways may or may not be connected to each other via an R4 interface 28 and are all connected directly or indirectly to a Mobile Telephony Switching Center (MTSC) (not shown). There may be one or more MTSC's in any one system. The MTSC is coupled to a telephony backbone that provides access to other telephony systems, data servers and services and more. In some instances, a BS may be connected directly to the MTSC through the backbone instead of through a gateway.

In the illustrated example, system administration and management can be distributed between the BS, GW, and MTSC in a variety of different ways. For communications, the first MS 12 can communicate with the second MS through the respective connected BS and GW. If both MS were registered at the same BS, the BS may be able to support communications without routing through the GW. Similarly, if the second MS were connected to another system, MTSC or ISP (Internet Service Provider), then the two MS can communicate through the backbone.

FIG. 1 shows one example network, however, the present invention can be applied to a wide range of different network configurations and communications can be routed differently to suit different situations and applications. The diagram of FIG. 1 represents a single Access Service Network (ASN). Each ASN may have several, even hundreds of BS and GWs. A BS is connected to a fixed GW using an R6 interface.

FIG. 1 shows an example of an MS 12 connected to BS 19. It is moving to the right in the diagram toward the next BS 20. The second BS 20 is connected to GW2 26. When the MS moves from the first BS, connected to GW1, to the second BS, connected to GW2, then there will be a handover of the MS from the first BS to the second BS.

Figure 6:
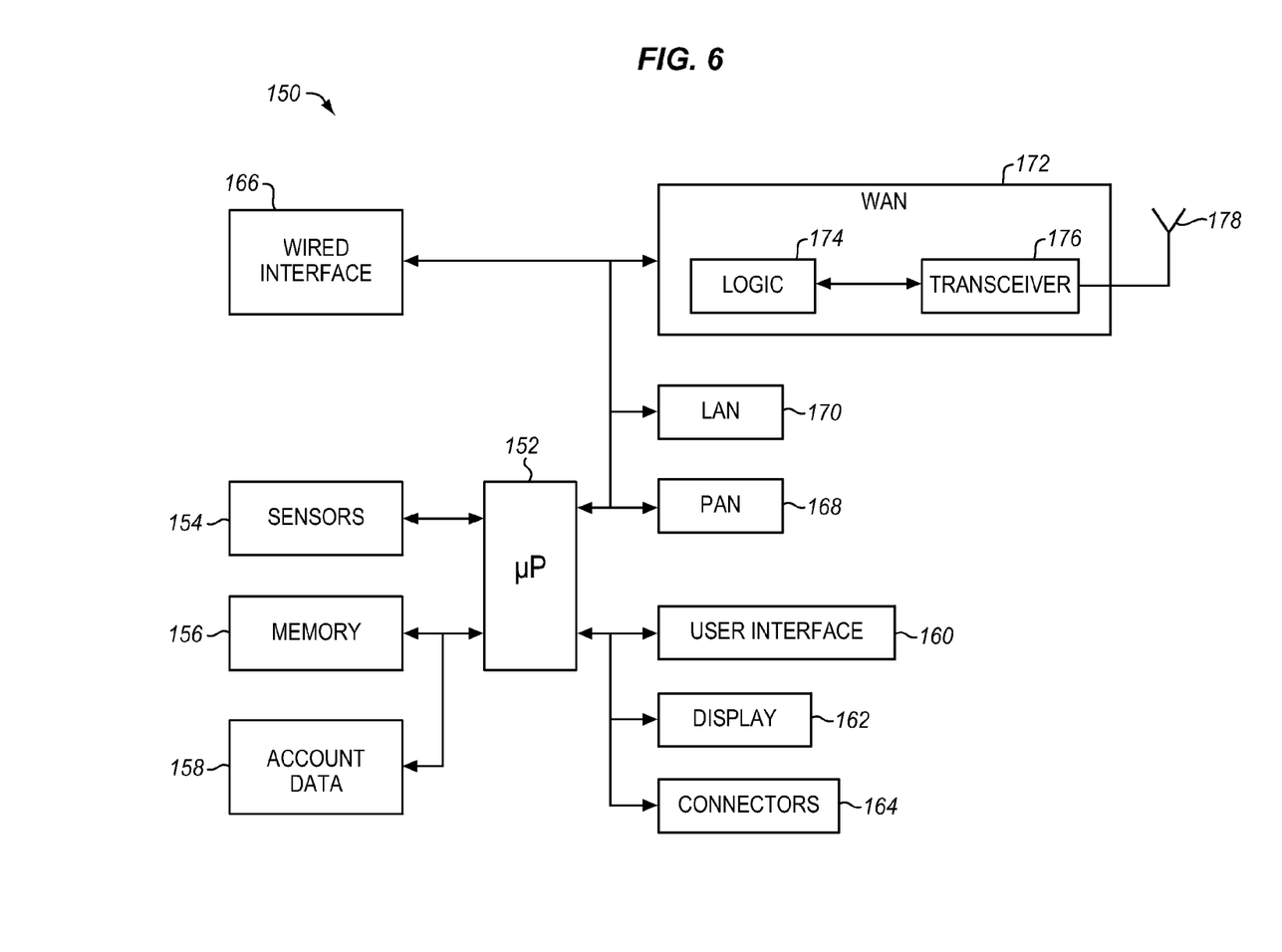
FIG. 6 is a block diagram of a radio terminal or station according to an embodiment of the invention.

FIG. 6 shows an example of a hardware configuration that can be used for both a base station and a mobile station to implement the communications described above. In FIG. 6, the station 150 is driven by a processor 152. This can be a small, low power processor in the case of a MS or a high power, high-speed processor in the case of a BS.

The processor has a memory bus that is coupled to a memory 156, such as magnetic, optical, or solid state memory or some combination thereof. The memory contains programming instructions and user data that can be sent and received between stations. Account data 158 can also be connected to the bus. For the MS, this can include a SIM (Subscriber Identity Module) and other stored personal parameters. For the BS this can include account authorization databases or connections to such databases.

A suite of sensors 154, such as positioning sensors, battery or power sensors, cameras and microphones, and transceiver signal sensors are coupled to the processor to provide additional data to the processor.

A user interface bus, such as USB (Universal Serial Bus) or another type of user interface connection connects the processor to a user interface 160, such as a keyboard, touch screen, mouse, trackball, or other interface, a display 162, and other connectors 164 to allow other devices to be connected. The particular user interface can be adapted to suit the particular application. A user can enter or attach text or other short messages through the user interface and can use the interface for system maintenance and control. For a MS, the user can, through the interface, make recordings with the microphone and camera and attach them to short messages that are commanded to be sent to a specific user or group of users using the keyboard or touch screen.

The processor 152 is coupled to another communications bus for communications with other devices. A wired interface 166 allows a BS to communicate with other BS's, gateways, base station controllers, operations and maintenance centers, etc. For the BS, the wired interface can allow for network connections and for a portable device, it may allow the device to be coupled to a personal computer for updates and maintenance. The communications bus also provides for wired or wireless connections to a personal area network (PAN) 168, such as Bluetooth, a local area network (LAN) 70 such as Wi-Fi, and a wide area network 172, or metropolitan area network such as 802.16m. More or fewer network adapters may be provided, depending on the application. Some network functions may be consolidated or separated, and a variety of different communications protocols and configurations may be used.

The wide area network (WAN) adapter 172 includes logic 174 to generate, assemble, encode, encrypt, and queue packets to be sent through the WAN. The logic is coupled to a transceiver 176 to modulate, encode, and amplify the packets from the logic for transmission through an antenna 178 over the WAN. The antenna may have one or more elements, depending on performance, cost and design considerations. The same transmit chain can also function as a receive chain or a separate receive chain (not shown) can be used. The receive chain would perform the reciprocal functions of receiving demodulating, amplifying, parsing, decoding, etc. to obtain data to send back to the processor over the communications bus.

The configuration of FIG. 6 can also be applied to a mobile station in the form of a portable or desktop computer equipped with a wireless adapter. The WAN adapter 172 can be provided as a separate component on USB, a PCI (Peripheral Component Interconnect) bus, or any other suitable bus, or it can be provided as an internal system component.

A lesser or more equipped communications station 150 than the example described above may be desirable for certain implementations. Therefore, the configuration of the system will vary from implementation to implementation depending upon numerous factors, such as price constraints, performance requirements, technological improvements, and/or other circumstances.

Embodiments of the present invention have been described in the context of WiMAX and particular messages within that communications protocol and standard, however, the invention is not so limited. Embodiments of the present invention can be applied to other communications protocols and other types of control messages within WiMAX and other protocols in order to allow mobile or subscriber stations to evaluate and select wireless resources.

In 3GPP LTE, for example, a subband indexing system is also used. Accordingly, the techniques described above can be used with almost no modification.

Similarly, embodiments of the invention have been described using terminology consistent with WiMAX architectures and protocols. However, the present description can also be understood as applicable to similar and equivalent devices and signals that use different names. For example, the term mobile station as used herein may instead, or in addition, be applied to an advanced mobile station, a subscriber station, a user station, a remote device, a subscriber unit, a mobile unit or similar device. The term base station may be applied to a base transceiver station, access point, wireless network node, relay or repeater station or similar device. The term gateway may be applied to a base station controller, switching center, wireless router, and similar devices. In addition, the description herein as applied to Channel Quality Indicators of subbands, can also be applied to other parameters of other radio resources, such as channels, sub-channels, carriers, subcarriers, etc. The present invention can be adapted to work with variations and modifications of these protocols as well as other protocols that are used in other types of systems.

While the steps described herein can be performed under the control of a programmed processor, such as the processor 152, in alternative embodiments, the steps can be fully or partially implemented by any programmable or hard coded logic, such as Field Programmable Gate Arrays (FPGAs), TTL logic, or Application Specific Integrated Circuits (ASICs), for example. Additionally, the method of the present invention can be performed by any combination of programmed general-purpose computer components or custom hardware components. Therefore, nothing disclosed herein should be construed as limiting the present invention to a particular embodiment wherein the recited steps are performed by a specific combination of hardware components.

The present invention can be provided as a computer program product that can include a machine-readable medium having instructions stored thereon, which can be used to program a computer (or other machine) to perform a process according to the present invention. The machine-readable medium can include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions.

In the present description, for the purposes of explanation, numerous specific details are set forth in order to provide a thorough understanding of the present invention. However, the present invention can be practiced without some of these specific details. In other instances, well-known structures and devices are shown in block diagram form. The specific detail can be supplied by one of average skill in the art as appropriate for any particular implementation.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A method comprising:
measuring a quality value for subbands of a radio communications system;
determining an index for each quality measurement;
applying a varying radix function to each quality measurement index;
generating a combinatorial index to reflect a combination of the varying radix function values of the indices and the selected subbands; and
sending the combinatorial index to a radio station using a radio communications channel.

2. The method of claim 1, wherein the quality value is a measure of a carrier to noise and interference ratio.

3. The method of claim 1, wherein the index is selected as one of 0 and 1.

4. The method of claim 1, wherein sending the index comprises sending the index as a Channel Quality Indicator.

5. A method comprising:
receiving a combinatorial index of channel quality from a radio station over a radio communications channel;
applying a varying radix function to the combinatorial index to derive varying radix values for quality measurement indices of a known number of subbands of a radio communications system;
selecting a subband based on the derived quality measurement indices; and
assigning a radio station to the selected subband for communications in the radio communications system.

6. The method of claim 5, wherein receiving the combinatorial index comprises receiving the index as a Channel Quality Indicator.

7. The method of claim 5, wherein applying a varying radix function comprises using known values for the number of subbands and the number of subbands for which a quality measurement has been made.

8. The method of claim 7, wherein applying a varying radix function comprises determining output positions in a vector form using the combinatorial index and deriving the quality measurement indices from the vector.

9. The method of claim 5, wherein applying a varying radix function comprises determining an increase value and a base value, comparing the combinatorial index to the increase value and the base value, determining output positions in a vector form based on the comparison, and deriving the quality measurement indices from the vector.

10. An apparatus comprising:
- sensors to measure a quality value for subbands of a radio communications system;
- a processor to determine an index for each quality measurement, to apply a varying radix function to each quality measurement index, and to generate a combinatorial index to reflect a combination of the varying radix function values of the indices and the selected subbands; and
- a transceiver to send the combinatorial index to a radio station using a radio communications channel.

11. The apparatus of claim 10 wherein the quality value is a measure of a carrier to noise and interference ratio.

12. The apparatus of claim 10, wherein the index is selected as one of 0 and 1.

13. The apparatus of claim 10, wherein the transceiver sends the index as a Channel Quality Indicator.

\* \* \* \* \*

UNITED STATES PATENT AND TRADEMARK OFFICE
CERTIFICATE OF CORRECTION

PATENT NO. : 8,315,183 B2
APPLICATION NO. : 12/646745
DATED : November 20, 2012
INVENTOR(S) : Yang et al.

Page 1 of 1

It is certified that error appears in the above-identified patent and that said Letters Patent is hereby corrected as shown below:

In the Specification

In column 3, at line 1 delete, " $\{S_i\}_{i=1}^{M}, (0 \leqq S_i \leqq N-1, S_i < S_{i+1})$ ,"

and insert -- $\{s_i\}_{i=1}^{M}, (0 \leq s_i \leq N-1, \ s_i < s_{i+1})$ --

In column 3, at line 29 delete, " $\{S_i\}_{i=0}^{M-1}, (1 \leqq s_i \leqq N, \ s_i < s_{i+1})$ ,"

and insert -- $\{s_i\}_{i=0}^{M-1}, (1 \leq s_i \leq N, \ s_i < s_{i+1}) \{s_i\}_{i=1}^{M}$ , --

In column 4, at line 41 delete, " $\{S_i\}_{i-1}^{M}, (0 \leqq s_i \leqq N-1, \ s_i < s_{i+1})$ ,"

and insert -- $\{s_i\}_{i=1}^{M}, (0 \leq s_i \leq N-1, \ s_i < s_{i+1})$ --

Signed and Sealed this
Twentieth Day of May, 2014

Michelle K. Lee
*Deputy Director of the United States Patent and Trademark Office*